(12) United States Patent
Guitton et al.

(10) Patent No.: US 6,879,686 B2
(45) Date of Patent: Apr. 12, 2005

(54) LINE TAKE-UP DETECTION CIRCUIT

(75) Inventors: Fabrice Guitton, Tours (FR); André Bremond, Veretz (FR)

(73) Assignee: STMicroelectronics S.A., Montrouge (FR)

( * ) Notice: Subject to any disclaimer, the term of this patent is extended or adjusted under 35 U.S.C. 154(b) by 675 days.

(21) Appl. No.: 09/843,095

(22) Filed: Apr. 25, 2001

(65) Prior Publication Data

US 2001/0036263 A1 Nov. 1, 2001

(30) Foreign Application Priority Data

Apr. 27, 2000 (FR) .............................. 00 05405

(51) Int. Cl.$^7$ ................................ H04M 1/00
(52) U.S. Cl. ................. 379/399.01; 379/377; 379/381; 379/382
(58) Field of Search ................ 379/399.01, 413.01, 379/413.02, 377, 381

(56) References Cited

U.S. PATENT DOCUMENTS

| | | | |
|---|---|---|---|
| 4,742,536 A | 5/1988 | Dewenter et al. .............. 379/97 |
| 5,111,502 A | 5/1992 | McClure et al. .............. 379/380 |
| 5,506,891 A | 4/1996 | Brown ..................... 379/97 |
| 5,654,984 A * | 8/1997 | Hershbarger et al. ....... 375/257 |
| 6,005,923 A | 12/1999 | Lee ........................ 379/93.09 |
| 6,359,983 B1 * | 3/2002 | Krone et al. ........... 379/399.01 |
| 6,377,667 B1 * | 4/2002 | Poulis et al. ............. 379/93.36 |
| 6,587,560 B1 * | 7/2003 | Scott et al. ............ 379/413.02 |
| 6,647,101 B2 * | 11/2003 | Rahamim et al. ........ 379/93.05 |
| 6,674,857 B1 * | 1/2004 | Fischer et al. .............. 379/413 |

FOREIGN PATENT DOCUMENTS

WO    WO 99/59325    11/1999

* cited by examiner

Primary Examiner—Huyen Le
Assistant Examiner—Tuan Pham
(74) Attorney, Agent, or Firm—Lisa K. Jorgenson; E. Russell Tarleton; Seed IP Law Group PLLC

(57) ABSTRACT

An interface circuit including a galvanic isolation barrier between a transmission line and a user equipment, and a detector for detecting, independently from a transmission, the idle or busy state of the line.

18 Claims, 4 Drawing Sheets

LINE TAKE-UP DETECTION CIRCUIT

TECHNICAL FIELD

The present invention generally relates to the field of interface circuits between a transmission line (for example, a telephone line) and a user equipment (for example, a modem connected to a computer). Such interface circuits especially have the function of isolating the transmission line from the user equipment since the transmission line (in particular if it is a telephone line) is not referenced with respect to the ground. Accordingly, an isolation of galvanic type is necessary between the line and the modem for obvious security reasons.

BACKGROUND OF THE INVENTION

FIG. 1 very schematically shows an example of an interface circuit between a telephone line 1 and a user equipment 2. Line 1 is a twin-wire line and is formed of two conductors T and R (tip and ring), which are connected to the two terminals of a primary winding 3p of an isolation transformer 3. Secondary winding 3s of transformer 3 is connected to the user equipment symbolized by a block 2. The user equipment is, for example, a modem and transformer 3 then is more specifically intended for the transmission of the data exchanged between line 1 and modem 2. On the side of line 1, other control and protection equipments are generally provided. In particular, series and parallel protection circuits are generally found, as well as detection and control circuits (for example, a line take-up relay) connected on the one hand to the line and on the other hand to the modem. It should be noted that, whatever the circuit used, the electric signals must respect the isolation constraint between the line and the user equipment and thus cross, for example by means of a transformer, of an optocoupler, of capacitors or the like, a galvanic isolation barrier symbolized by a stripe-dot line IB in FIG. 1.

The detection circuits included by the interface circuit on the line side include in particular a bell detection circuit 4 (SONN). This circuit includes two input terminals 5, 6 respectively connected to conductors T and R of line 1. Circuit 4 has the function of detecting the occurrence of a bell signal on the line to enable the user equipment to pick up to receive a call, for example a fax in the case of a modem. Bell detection circuit 4 is connected to modem 2, on the user equipment side, via an isolation circuit 7 formed, in the example of FIG. 1, of an optocoupler. Optocoupler 7 is generally formed of a light-emitting diode 8, the two terminals of which are connected to two output terminals of circuit 4 and of an opto-transistor 9, the emitter and the collector of which are connected to modem 2.

On the side of user equipment 2, the secondary winding 3s of the transformer is generally connected to a so-called hybrid two wire—four wire circuit (not shown) intended for enabling the sending and receiving of a wanted signal over a same transmission line and for separating the transmitted signals from the received signals.

A disadvantage of conventional interface circuits, which translates as a functional disadvantage of modems, is that they are not able to detect the state of telephone line 1, that is, to know whether this line is busy or not. This disadvantage is particularly disturbing in the case where a same telephone line is shared between a conventional telephone equipment and a modem. In such a case, the computer exploiting the modem is incapable of knowing whether a conversation is on the line when it desires to transmit by means of the modem. Conventionally, the modem tries to perform a connection on the line, and its processing program generates an error message for the user (visible on the computer screen) to indicate that the connection has failed. This detection cannot be performed without the modem trying to take up the line. Accordingly, this results, for the user of a telephone set or for another modem occupying the line, in a pollution of the signal (audible or data pollution).

SUMMARY OF THE INVENTION

The embodiments of the present invention aim at overcoming the disadvantages of conventional interface circuits by enabling detection of the line state by the modem.

The embodiments of the present invention also aim at respecting the isolation constraints between the transmission line and the user equipment.

The embodiments of the present invention also aim at enabling a detection of the line state without it being necessary to operate a line take-up circuit generally provided in the interface circuit.

The disclosed embodiments of the present invention further aim at providing a solution that optimizes the number of components necessary to cross the isolation barrier.

To achieve the foregoing, the embodiments of the present invention provide an interface circuit including means forming a galvanic isolation barrier between a transmission line and a user equipment, and means for detecting, independently from a transmission, the idle or busy state of the line.

According to an embodiment of the present invention, said detection means include, on the line side with respect to the isolation barrier, an oscillating circuit associated with an element detecting that a voltage threshold has been exceeded, only supplying the oscillating circuit when the line state is not busy, and on the user equipment side, a circuit for detecting the amplitude of an oscillating signal provided by said oscillating circuit and having transited through the isolating means.

According to an embodiment of the present invention, the interface circuit includes a detector of the presence of a bell signal on the line, translating as a ripple of high amplitude thereon.

According to an embodiment of the present invention, the bell signal detector and said means for detecting the idle or busy state of the line share the same galvanic isolation means.

According to an embodiment of the present invention, the bell signal detector detects the exceeding of a voltage threshold on the line.

According to an embodiment of the present invention, the interface circuit includes means for modulating the supply amplitude of the oscillating circuit according to whether a bell signal is present or not on the line.

According to an embodiment of the present invention, the interface circuit includes, on the equipment side, an output stage providing two logic signals for the user equipment, said signals providing, in combination, three states respectively corresponding to an idle state of the line, to a busy state of the line, or to the presence of a bell signal thereon.

According to an embodiment of the present invention, the interface circuit includes a means for rectifying the signal present on the line.

The foregoing features and advantages of the present invention will be discussed in detail in the following non-limiting description of specific embodiments in connection with the accompanying drawings.

DETAILED DESCRIPTION OF THE INVENTION

Figure 1:
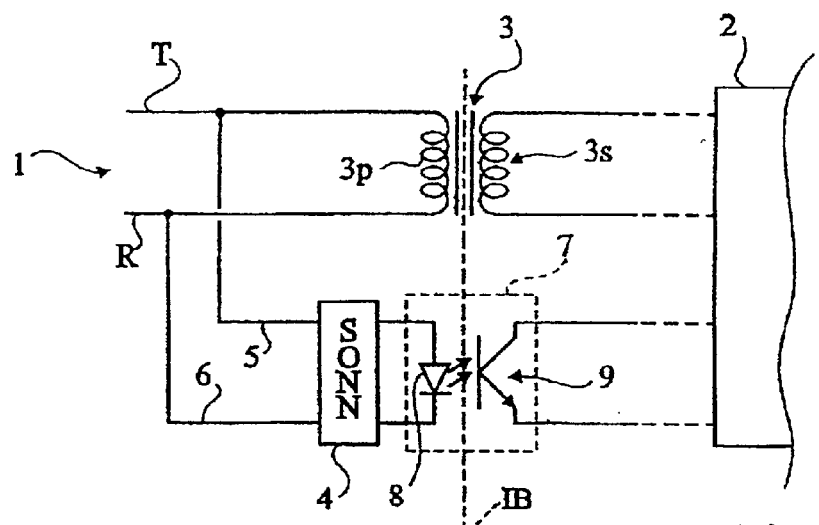
FIG. 1, previously described, is intended for showing the state of the art and the problem to solve.

The same elements have been designated by the same references in the different drawings. For clarity, the timing diagrams of FIGS. 5A to 5H have been drawn out of scale and only those elements of the interface circuit which are necessary to the understanding of the present invention have been shown in the drawings and will be described hereafter. In particular, different control and detection circuits (for example, the line take-up circuit) have not been shown in the drawings and are no object of the present invention. Similarly, the hybrid circuits generally associated with the interface circuit are no object of the present invention and have not been shown in the drawings.

A feature of the present invention is to provide, on the transmission line side, that is, opposite to the isolation barrier with respect to the user equipment, an oscillating circuit adapted to providing an oscillating signal at least when the transmission line is idle.

The present invention takes advantage of the differences between the levels of the voltages present on the transmission line according to its different states. Indeed, in the idle state, that is, when the line is free, the voltage present between the two conductors T and R (FIG. 1) is set by the telephone operator to a first level (for example, 48 volts). This D.C. voltage level may be positive or negative, that is, the telephone operator does not set the biasing of the line when idle. The occurrence of a bell signal on the line results in the presence of a sinusoidal signal of very high amplitude as compared to the idle voltage. For example, this sinusoidal voltage has an amplitude on the order of 200 peak volts. When the transmission line is busy, that is, when a voice or data communication transits thereon, the current consumption results in a drop of the line voltage generally amounting to more than half its idle voltage. Thus, referring to the example of an idle line at a 48-volt potential, when the line is busy, its mean level is lower than 20 volts.

Considering this, the embodiments of the present invention generate an oscillating signal when the line is idle and sending this oscillating signal through the isolation barrier of the interface circuit to the user equipment. It being an oscillating signal, it may transit, for example, through a capacitor, which is a preferred embodiment of the present invention, due to its low cost as compared to a transformer.

Figure 2:
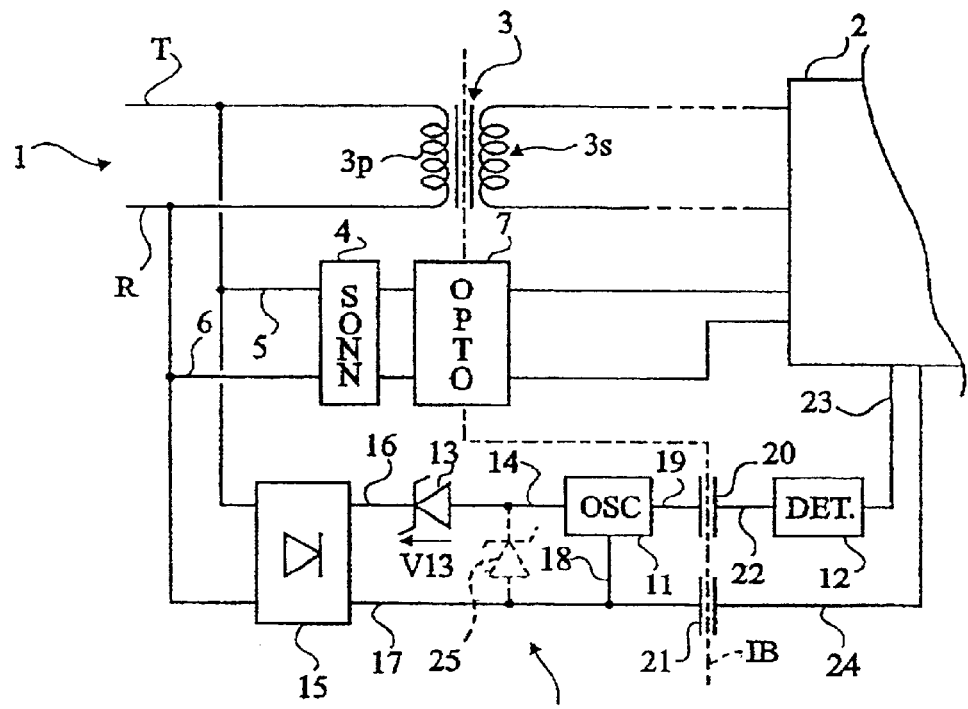
FIG. 2 partially shows, in a simplified manner, an embodiment of an interface circuit according to the present invention.

FIG. 2 partially shows in a simplified manner a first embodiment of the present invention.

As previously, a telephone line 1 symbolized by its two conductors T and R is connected, for the transmission of information and data to a user equipment (for example, a modem 2), to primary 3p of an isolation transformer 3, the secondary 3s of which is connected to modem 2.

According to the first embodiment illustrated in FIG. 2, the circuit includes, like a conventional interface circuit, a bell detection circuit (SONN) 4, two input terminals 5 and 6 of which are connected to conductors T and R, and the detection outputs of which are connected to modem 2 via a galvanic isolation means 7 (for example, an optocoupler OPTO).

According to the present invention, a line state detection circuit 10 is provided with, on the side of line 1, an oscillating circuit (OSC) 11, and on the side of user equipment 2, a voltage level detector 12 (DET). The detector is, preferably, a peak amplitude detector.

On the line side, oscillating circuit 11 is associated, at its input, with a voltage measurement element of the type detecting the exceeding of a voltage threshold, the function of which is to only supply oscillating circuit 11 when the voltage across the line exceeds a threshold V13. In the example of FIG. 2, the voltage threshold detection circuit is formed of a zener diode 13, the anode of which is connected to a supply terminal 14 of oscillating circuit 11 and the cathode of which is intended for receiving the signal present on the transmission line.

Since the biasing of the transmission line is not set by the operator, a rectifying means 15, for example a diode bridge, is provided between the conductors of line 1 and the line state detection circuit of the present invention. The rectifying performed by circuit 15 is fullwave to enable a detection independently from the line biasing. A positive output 16 of rectifying element 15 is connected to the cathode of zener diode 13 while reference output 17 of the rectifying element is connected to a second input terminal 18 of oscillating circuit 11. Terminal 18 forms the reference terminal of this oscillating circuit. At its output 19, circuit 11 provides an oscillating signal only when the level of the voltage between terminals 16 and 17 exceeds voltage V13 set by element 13. This oscillating signal then transits through isolation barrier 1B. The galvanic isolation is, in the embodiment illustrated in FIG. 2, obtained by means of two capacitors 20, 21, respectively receiving the signals present on terminals 19 and 17.

On the side of user equipment 2, capacitor 20 is connected to an input terminal 22 of voltage level detector 12, output 23 of which provides the result of the detection to modem 2. The reference level of the detection signal is set by the second electrode 24 of capacitor 21, which is connected to modem 2.

Zener diode 13 is sized so that, when the voltage level between terminals 16 and 17 is smaller than the voltage level corresponding to the idle state of the line, the oscillating circuit is not supplied. Thus, oscillating circuit 11 is supplied and provides a signal on capacitor 20, be it when the line is idle or in the presence of a bell signal having a peak or mean level greater than the voltage level in the idle state.

Optionally, a protection component 25 may be provided across input terminals 14 and 18 of oscillating circuit 1. Component 25 illustrated in dotted lines in FIG. 2 may be formed of a zener diode, the anode of which is connected to terminal 18 and the cathode of which is connected to terminal 14. Its function can then be to limit the input voltage of the oscillating circuit in the presence of a bell signal of several hundreds of volts.

It should be noted that, with a detector 12 only detecting the presence of an oscillating signal on capacitor 20, the result at output 23 of detector 12 makes no difference between the idle state of the line and the presence of a bell signal. However, since a bell detector 4 is provided in parallel, modem 2 is, in this embodiment, capable of interpreting the results from the two detectors by logic means to dissociate the two states.

As an alternative, an improved amplitude detector 12 may be provided, which only provides a positive detection result when the voltage level of the oscillating circuit crossing capacitor 20 is included between two values, that is, greater than a threshold representative of the idle state of the line and smaller than a threshold representative of the presence of a bell signal.

Figure 3:
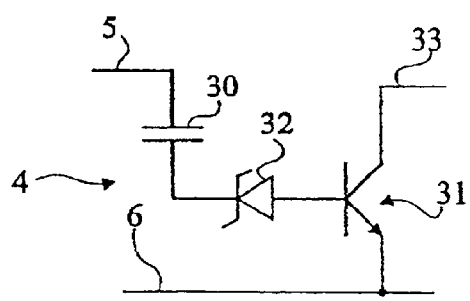
FIG. 3 shows a simplified example of embodiment of a bell detection circuit.

FIG. 3 shows an example of a bell detection circuit 4 likely to be used in the embodiment of FIG. 2. The two input terminals 5 and 6 of detector 4 are respectively sent onto a first electrode of a capacitor 30 and onto the emitter of an output transistor 31. The second electrode of capacitor 30 is connected to the cathode of a zener diode 32, the anode of which is connected to the base of transistor 31. Collector 33 of transistor 31 forms the other output terminal of bell detector 4. The presence of capacitor 30 enables avoiding that the D.C. level of the line in the idle state biases transistor 31, only the A.C. bell signal transiting through this transistor 30. Zener diode 32 is chosen so that its threshold is greater than the possible ripple with respect to the D.C. level, be it due to the oscillations of the transmitted information when the line is busy or to noise when the line is idle.

It should be noted that other conventional bell detection circuits may be used instead of the example illustrated in FIG. 3.

An advantage of the present invention is that modem 2 can detect whether line 1 is idle or busy without having to take it up. Accordingly, this detection generates no pollution on the line.

Figure 4:
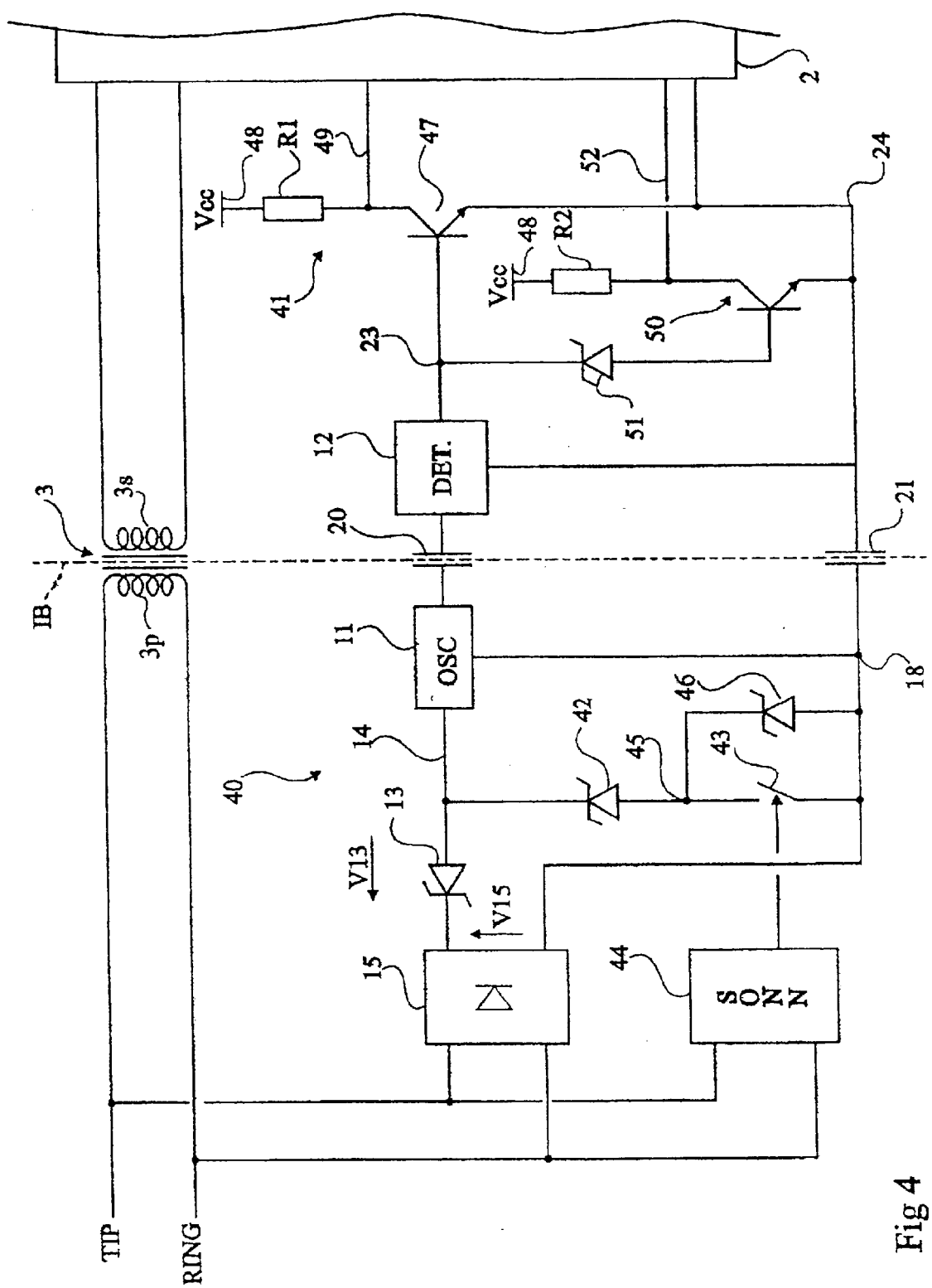
FIG. 4 shows a second preferred embodiment of an interface circuit according to the present invention.

FIG. 4 shows a second preferred embodiment of a circuit 40 for detecting the state of a transmission line. The embodiment of FIG. 4 especially aims at minimizing the number of components necessary to have the signals transit through isolation barrier IB (FIGS. 1 and 2).

On the data transmission side (transformer 3), this embodiment is not different from the embodiment of FIG. 2. Further, detection circuit 40 uses an oscillating circuit 11, a detector of the exceeding of a voltage threshold 13, and a fullwave rectifying means 15 on the line side with respect to the isolation barrier, as in the embodiment of FIG. 2. Downstream of the isolation barrier, this detector uses an amplitude detector 12 again and isolation barrier IB is crossed, as in the embodiment of FIG. 2, by means of two capacitors 20 and 21.

A feature of the preferred embodiment of the present invention is to combine the bell and line state detection within a same detector. According to this embodiment, the isolation barrier is crossed by two connections only instead of four in the first embodiment. For this purpose, the present invention takes advantage of the fact that the presence of a bell signal results in a voltage level much higher than the voltage level of the idle line, itself higher than the voltage level of the busy line.

According to the present invention, it is provided to modulate the amplitude of the supply voltage of oscillating circuit 11 according to the presence or not of a bell signal. This supply amplitude modulation translates, at the level of detector 12, as a different voltage level at the output of this detector. It can then be provided to interpret these level differences to determine the line state or the presence of a bell signal. According to a preferred embodiment illustrated by the drawings, detection circuit 40 is associated with an output stage 41 directly transforming the output of detector 12 into logic levels for modem 2.

To modulate the supply amplitude of oscillating circuit 11, that is, the amplitude of the voltage across its input terminals 14 and 18, at least one zener diode 42 is provided in series with a switch 43 between its terminals 14 and 18, switch 43 being controlled by the detection result of a bell detection circuit 44 according to the present invention. The cathode of zener diode 42 is connected to terminal 14 while its anode is connected to a first terminal 45 of the switch, a second terminal of which is connected to terminal 18.

According to a simplified embodiment such as described hereabove, but not entirely shown in FIG. 4, the function of switch 43 is to introduce zener diode 42 into the circuit, that is, to cause the limitation of the input voltage level of the oscillating circuit to the threshold value of diode 42. According to a first example of embodiment, switch 43 is chosen to be normally on, that is, diode 42 limits the input voltage of the oscillating circuit in the absence of a bell signal. According to a second example, switch 43 is chosen to be normally off. In this case, zener diode 42 is introduced in the circuit when a bell signal is present on the line. In this second example, bell detection circuit 44 may be of the type illustrated in FIG. 3. Collector 33 of transistor 31 is then connected to anode 45 of diode 42.

In the preferred embodiment illustrated in FIG. 4, a second zener diode 46 is provided in parallel switch 43. Zener diode 46 is then in series with diode 42. Switch 43 then aims at short-circuiting diode 46 in the absence of a bell signal. This switch is a normally-on switch.

When the line is busy, that is, when its voltage level is lower than the idle voltage level (commonly called the battery level), zener diode 13 blocks the supply of oscillating circuit 11.

When the line is idle and in the absence of a bell signal, circuit 11 is powered and its supply voltage is limited by diode 42. Accordingly, the oscillating signal at the output of circuit 11 has a first relatively low amplitude.

In the presence of a bell signal, detector 44 turns off switch 43, which results in placing zener diodes 42 and 46 in series. The supply amplitude of oscillating circuit 11 is then higher than when the line is idle, which results, at the output of circuit 12, in a higher amplitude.

Isolation barrier IB is crossed by the signals provided by the oscillating circuit as in the first embodiment. Level detector 12 receives these signals and provide, on its output terminal 23, a relatively high voltage level in the presence of a bell signal and a relatively low level in the absence of a bell signal. It should be noted that, as previously, this voltage level is null in the case where the line is busy. Terminal 23 is connected to a first switch 47 (for example, a bipolar transistor) of output stage 41. The collector of transistor 47 is connected to a terminal 48 of application of a positive biasing voltage Vcc (for example, 5 volts, to correspond to a logic level) via a resistor R1. The emitter of transistor 47 is connected to ground 24. A first logic output 49 is sampled from the collector of transistor 47 for modem 2. This output is high when switch 47 is off and low when said switch is on, that is, in the presence of an idle line or of a bell signal.

According to the preferred embodiment of the present invention, terminal 23 is also connected to the control terminal of a second switch 50 via a zener diode 51 (or an equivalent voltage threshold detector). Switch 50, formed for example in the form of a bipolar transistor, has its collector connected to terminal 48 via a biasing resistor R2 and its emitter connected to ground 24. The threshold of zener diode 51 is chosen to be included between the two relatively high and relatively low levels provided by detector 12. The collector of transistor 50 forms an output terminal 52 providing a second logic signal for modem 2. When the output voltage of detector 12 is lower than the threshold of diode 51 (that is, in the absence of a bell signal or when the line is busy), switch 50 is off and the state of terminal 52 is high (1). When the threshold of zener diode 51 is exceeded by the output voltage of detector 12, that is, in the presence of a bell signal, switch 50 is off and terminal 52 provides a low logic level (0).

It should be noted that an inverted operation is obtained with a switch 43 in a normally-off state, which is on in the presence of a bell signal.

Figure 5:
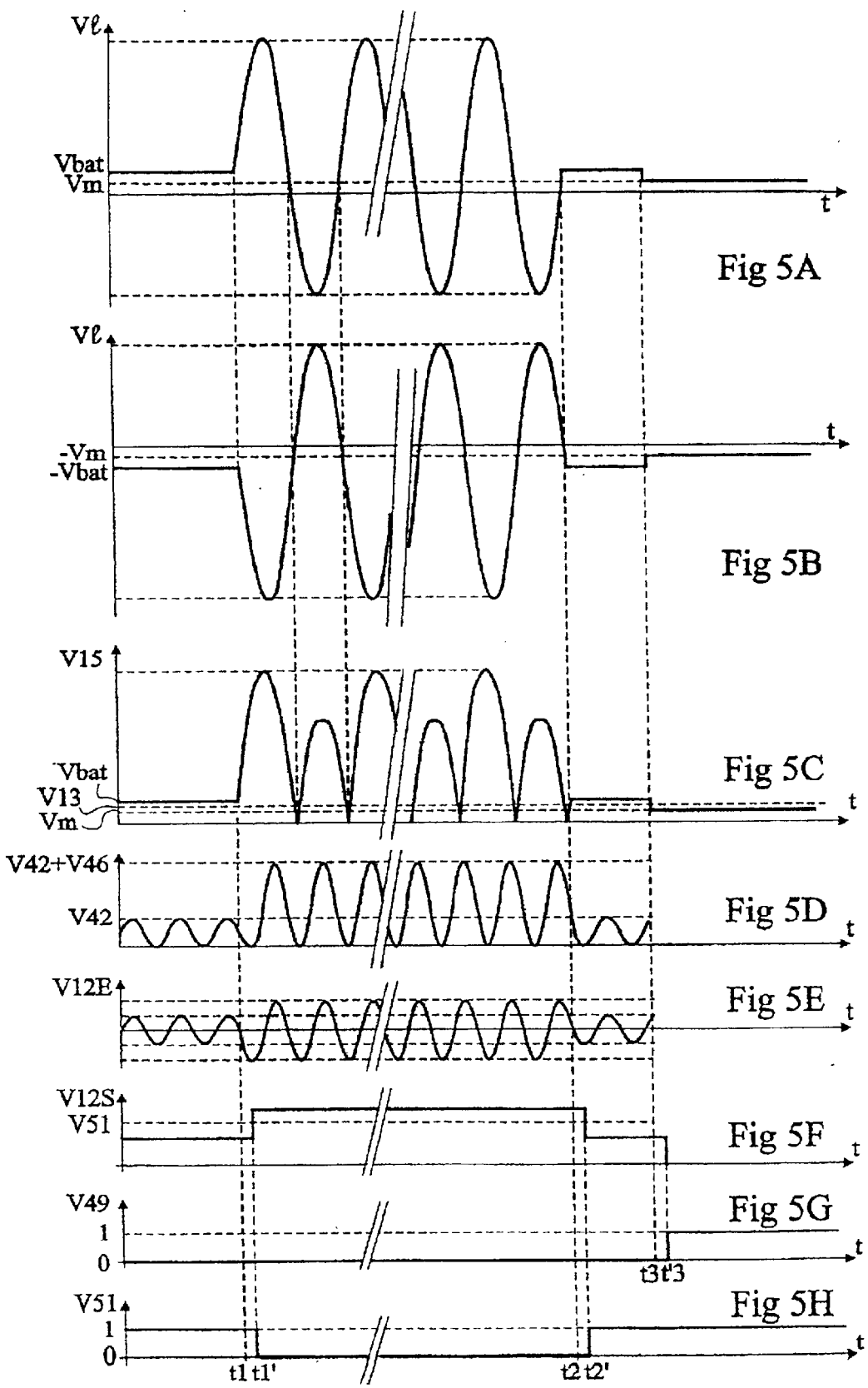
FIGS. 5A to 5H illustrate, in the form of timing diagrams, the operation of an interface circuit according to the preferred embodiment of the present invention.

The operation of a compound detection circuit according to the present invention is illustrated by the timing diagrams of FIGS. 5A to 5H, which show the respective shapes of characteristic voltage levels of the circuit of the present invention for an example of a signal present on line 1. FIG. 5A shows an example of line voltage V1 between conductors T and R, assuming a positive biasing of conductor T with respect to conductor R. FIG. 5B shows the same line voltage V1, but assuming a negative biasing of line 1. It should thus be noted that the two timing diagrams of FIGS. 5A and 5B cannot occur simultaneously, but depend on the biasing imposed by the operator to the transmission line. These figures have been illustrated in parallel to show that the circuit of the present invention operates independently from the line biasing. FIG. 5C shows the shape of voltage V15 at the output of rectifying bridge 15. FIG. 5D shows the shape of voltage V11 at the oscillating circuit output. FIG. 5E shows the shape of voltage V12E at the input of circuit 12. FIG. 5F shows the shape of voltage V12S at the output of circuit 12. FIGS. 5G and 5H show the respective logic levels V49 and V52 at the output of circuit 40 of the present invention. In the representation of FIGS. 5A to 5G, it has been assumed that switch 43 of the detection circuit is in a normally on state, that is, diode 46 is short-circuited by switch 43 in the absence of a bell signal.

In the left-hand portion of the timing diagrams, it is assumed that the line is in an idle state, that is, its voltage corresponds to a substantially D.C. level Vbat (for example, on the order of 48 volts). This level is greater than threshold voltage V13 of zener diode 13 (FIG. 5C). Accordingly, oscillating circuit 11 is powered. This results (FIG. 5D) in an oscillating signal at a relatively low level V11 at the oscillating circuit output. This results in an amplitude V42 of the oscillations at the output of circuit 11 corresponding to the threshold voltage of diode 42. At the input of circuit 12 (FIG. 5E), these oscillations are, after crossing the isolation barrier, centered back on the equipment ground. At the output of detection circuit 12 (FIG. 5F), the voltage level is lower than threshold voltage V51 of zener diode 51. Accordingly, switch 50 is off while switch 47 is on. Level V49 is thus low while level V52 is at logic state 1 (substantially corresponding to supply voltage Vcc).

It is assumed that a bell signal appears at a time t1. This bell signal results in an oscillation of the line voltage with a peak amplitude of several hundreds of volts around level Vbat. Whether the line is positively or negatively biased, the rectification performed by circuit 16 enables obtaining the same waveform whatever the biasing (see the timing diagram of FIG. 5C). The amplitude of signal V15 at the bridge output is greater than threshold V13 of diode 13. Further, bell detector 44 turns off switch 43, which results in placing diode 46 in series with diode 42. Accordingly, the supply amplitude of circuit 11 corresponds to the sum of thresholds V42 and V46 of diodes 42 and 46. This results in an increase of the amplitude of oscillating signal V11, and thus of voltage level V12S at the output of detector 12. The sizing of zener diode 51 is chosen so that its threshold voltage V51 is then smaller than the level of voltage V12S. Accordingly, both switches 47 and 50 are on and signals V49 and V52 are both at the low logic level.

It is assumed that at a time t2, the bell signal disappears and the line remains idle. This is the same situation as previously described before time t1.

Assuming that at a time t3, the line becomes busy, be it for modem 2 itself or for another equipment connected on the line, this busy state results in a drop of line voltage V1 to a mean level Vm lower than battery level Vbat (FIG. 5A) or −Vbat (FIG. 5B). This level decrease is reflected on the output V15 of the rectifying bridge. Output voltage V15 is then smaller than threshold voltage V13 of the input zener diode of the oscillating circuit. Accordingly, said circuit is no longer powered and provides no output signal. This results in no powering of detection circuit 12, the output signal of which can thus not be greater than threshold voltage V51 of diode 51. Accordingly, both switches 47 and 50 are off and outputs 49 and 52 are both high.

The modem thus just has to interpret the logic signals present on terminals 49 and 52 to determine the line state with certainty. As an alternative, it may be provided for the modem to directly interpret output signal V12S of circuit 12 and to itself perform an analysis of the voltage levels.

It should be noted that the line occupation may occur just after the presence of the bell signal (for example, after "picking up" by modem 2), and the state described subsequently to time t3 then is found as soon as time t2.

It should also be noted that in FIG. 5F and the following, switching times t1', t2', t3' have been slightly shifted with respect to times t1, t2, and t3 to take account of the times of establishment of the voltage level by detector 12. Indeed, an amplitude detector generally uses a storage element of capacitor type and said capacitor then requires time to charge or discharge when the level switches.

Figure 6:
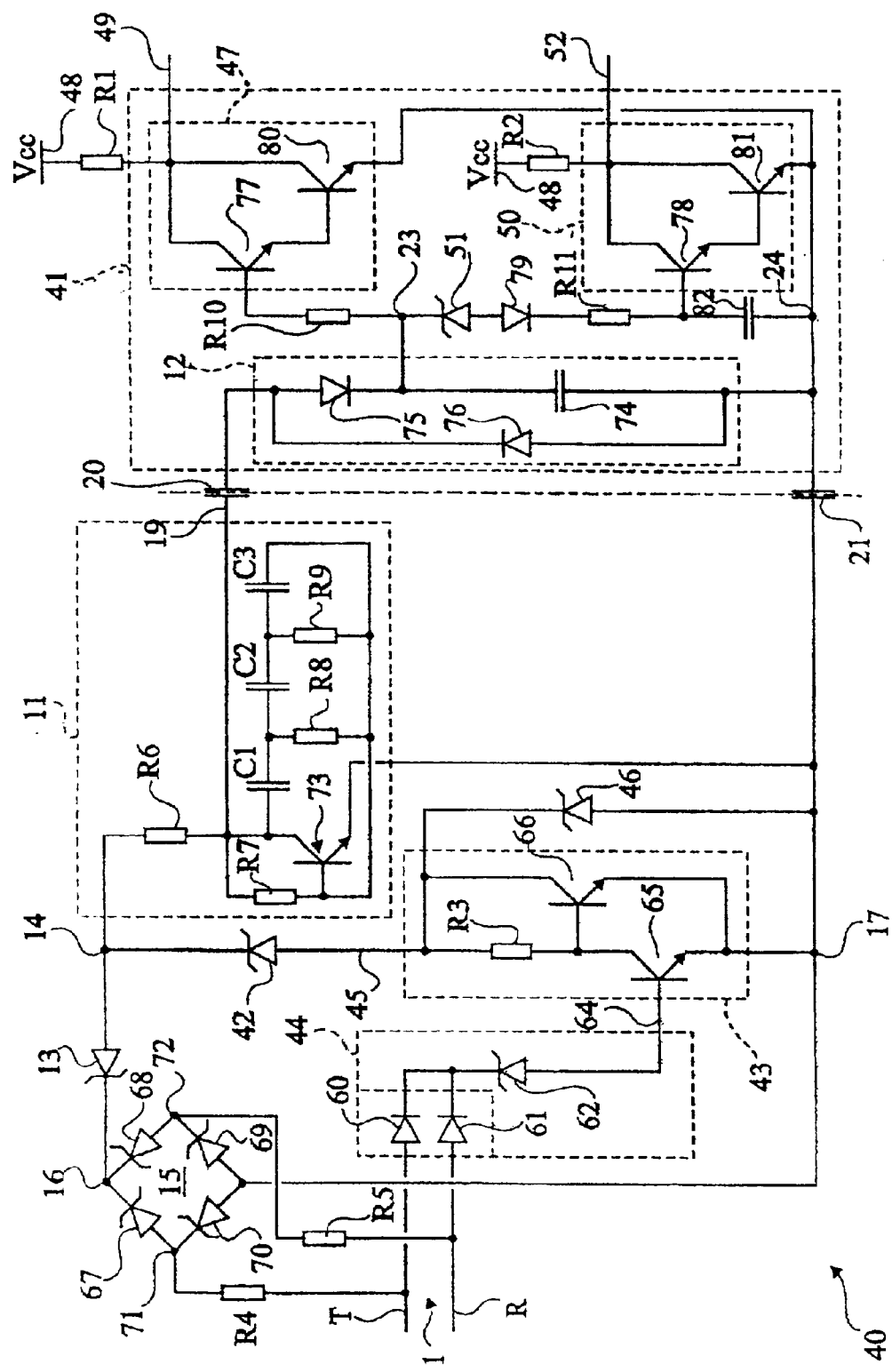
FIG. 6 is a detailed electric diagram of the line state and bell detection circuit shown in FIG. 4.

FIG. 6 shows an example of a detailed electric diagram of circuit 40 of the present invention described in relation with FIG. 4. FIG. 6 aims at presenting practical examples of an embodiment of rectifying bridge 15, of oscillating circuit 11, of level detector 12, and of output stage 41, as well as a preferred embodiment of a bell detector 44 associated with a specific embodiment of switch 43.

The preferred embodiment of the bell detector of the present invention has the feature of no longer detecting the presence of an oscillating circuit, as is the case for a conventional detector as well as in the example of FIG. 3, but of only detecting a voltage level. This feature is made possible by the fact that the present invention provides restoring an oscillating signal at the bell detection output. Indeed, in conventional interface circuits, the oscillation must be maintained to cross the isolation barrier. This is no longer necessary by combining the bell detector with the line state detector of the present invention.

Thus, in the embodiment illustrated in FIG. 6, detector 44 is formed of two rectifying diodes 60 and 61 respectively interposed on conductors T and R at the input of detector 44. The outputs of diodes 60 and 61 are interconnected and thus provide a rectified line voltage. This rectified signal is sent onto the cathode of a zener diode 62, the anode of which is connected to control terminal 64 of switch 43. The function of zener diode 62 is to detect a relatively high voltage level, greater than the battery voltage level (idle line). For example, a zener diode 62 or an association of several zener diodes in series forming a threshold on the order of 60 may be provided.

Control terminal 64 of switch 43 corresponds, in this example, to the base of a first NPN-type bipolar transistor 65, the emitter of which is connected to reference line 17 corresponding to one of the rectified outputs of bridge 15. The collector of transistor 65 is connected to the base of a second NPN-type transistor 66, the emitter of which is also grounded and the collector of which forms terminal 45 connected to the anode of zener diode 42. A current-limiting resistor R3 is connected between the collector of transistor 66 and that of transistor 65.

An advantage of the embodiment of detector 44 illustrated in FIG. 6 is that, except for diodes 60 and 61 which are high-voltage components, the rest of these components are perfectly integrable. By comparison, in an oscillating signal detector, the high-voltage capacitor that is necessary to be provided (30, FIG. 3) is not integrable.

In the example of FIG. 6, fullwave rectifying bridge 15 is formed of four zener diodes 67, 68, 69, and 70. The use of zener diodes rather than simple diodes has the advantage of protecting circuit 40. A first A.C. input terminal 71 of bridge 15 is connected to conductor T via a current-limiting resistor R4. A second A.C. input terminal 72 of bridge 15 is connected to conductor R via a current-limiting resistor R5. As will appear from the discussion of the other components of circuit 40, resistors R4 and R5 form, with diodes 60 and 61, the two sole non-integrable components of the circuit of the present invention (except for galvanic isolation capacitors 20 and 21).

The anodes of diodes 67 and 68 form together the positive rectified output terminal 16 of bridge 15 connected to the anode of zener diode 13.

Oscillating circuit 11 is based on the use of an NPN-type bipolar transistor 73. The collector of transistor 73 forms terminal 19 of oscillating circuit 11 and is connected, via a resistor R6, to input terminal 14. The emitter of transistor 73 is connected to reference line 17. The collector and the base of transistor 73 are connected together by means of a biasing resistor R7. The collector of transistor 73 is also connected to its base by a phase-shifting circuit formed of a series association of three capacitors C1, C2, and C3 preferably of same value. The junction point of capacitors C1 and C2 is connected to the base of transistor 73 via a resistor R8, and the junction point of capacitors C2 and C3 is connected to this base via a resistor R9. The three RC components introduce the successive 60-degree phase shifts causing the required oscillation (the three components form a phase-shifter by 180°).

Peak amplitude detection circuit 12 is based on the use of a storage capacitor 74, a first electrode of which is connected to ground 24 and a second electrode of which is connected, via a rectifying diode 75, to capacitor 20, the anode of diode 75 being connected to capacitor 20 that is charged during positive halfwaves of the oscillating circuit. A diode 76 is also provided between capacitors 20 and 21, that is, between the anode of diode 75 and ground 24. The function of diode 76 is to ensure the conduction of the isolating circuit (C20 and C21) during negative halfwaves. It should be noted that diode 75 prevents capacitor 74 from discharging somewhere else than into output stage 41.

Output 23 of detector 12 is sent, via resistors R10 and R11, respectively onto the bases of two transistors 77 and 78 forming NPN-type input transistors of Darlington-type assemblies forming switches 47 and 50. On the side of switch 50, a diode 79 may be provided between zener diode 51 and resistor R11, to lower the capacitance of zener diode 51. The collectors of transistors 77 and 78 form the respective output terminals 49 and 52 of stage 41. These collectors are each connected to the collector of a second NPN-type transistor, respectively 80 and 81, of the corresponding Darlington assembly. The base of transistor 80 is connected to the emitter of transistor 77. The base of transistor 81 is connected to the emitter of transistor 78.

The operation of the detailed diagram of FIG. 6 can be deduced from the operation discussed in relation with FIG. 4. It should be noted that the respective sizings of the circuit components are chosen so that transistors 77, 80, and 78, 81 of switches 47 and 50 operate in all or nothing, that is, are saturated as soon as they are on.

If desired, a capacitor 82 may be provided between the base of transistor 78 and ground 24. The function of this capacitor is to limit the level oscillations at the output of stage 41.

The respective sizings of the components of the circuit of the present invention are within the abilities of those skilled in the art based on the functional indications given hereabove and on the features desired for the detector voltage levels. Preferably, the oscillation frequency chosen for circuit 11 is greater than 20 kHz to be outside of the audible field. The choice of such a frequency also conditions the preferred choice of capacitors for the galvanic isolation, this frequency being too high for current optocouplers.

An advantage of the disclosed embodiments of the present invention is that the detection is performed independently from any data transmission over the line. Further, in the preferred embodiment of the present invention, isolation components are spared.

Of course, the present invention is likely to have various alterations, modifications, and improvements which will readily occur to those skilled in the art. In particular, other components performing the same functions as those described in relation with FIG. 6 may be used. The illustrated components however have the advantage of maximizing the possible integration of the detection device of the present invention.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An interface circuit, comprising:

means forming a galvanic isolation barrier between a transmission line and a user equipment; and a circuit for detecting the idle or busy state of the line, said detecting circuit comprising:

on the line side with respect to the isolation barrier, an oscillating circuit associated with an element detecting that a voltage threshold has been exceeded and only supplying the oscillating circuit when the line state is not busy; and on the user equipment side, a circuit for detecting the amplitude of an oscillating signal provided by said oscillating circuit and having transited through the isolation barrier, the amplitude of the oscillating signal measured on the user side for detecting, independently from a transmission, the idle or busy state of the line.

2. The interface circuit of claim 1, comprising a detector of the presence of a bell signal on the line, translating as a ripple of high amplitude thereon.

3. The interface circuit of claim 2, wherein the detector and said means for detecting the idle or busy state of the line share the same galvanic isolation barrier.

4. The interface circuit of claim 3, wherein the detector detects the exceeding of a voltage threshold on the line.

5. The interface circuit of claim 2, comprising means for modulating the supply amplitude of the oscillating circuit according to whether a bell signal is present or not on the line.

6. The interface circuit of claim 1, comprising on the equipment side, an output stage providing two logic signals for the user equipment, said two logic signals providing, in combination, three states respectively corresponding to an idle state of the line, to a busy state of the line, or to the presence of a bell signal thereon.

7. The interface circuit of claim 1, comprising a means for rectifying the signal present on the line.

8. A circuit for interfacing a transmission line with user equipment, the circuit comprising:

a line condition detecting circuit coupled to the transmission line and configured to detect when the line is busy and not busy and to output a line condition signal when the line is not busy;

an oscillator circuit coupled to the line condition detecting circuit and configured to generate an oscillating output signal in response to the line condition signal; and a detector coupled to the user equipment and configured to detect the oscillating output signal and to enable the user equipment to use the transmission line in response to the output signal, the detector configured to measure the amplitude of the oscillating output signal on the user equipment independent of a transmission signal to detect whether the line is busy or not busy.

9. The circuit of claim 8, further comprising a galvanic isolation circuit coupled to the transmission line and the user equipment and configured to provide galvanic isolation between the oscillator circuit and the detector circuit.

10. The circuit of claim 9, wherein the oscillator circuit is configured to generate the output signal at a first level when the line condition signal indicates the transmission line is not busy and at a second level when the transmission line is busy.

11. The circuit of the claim 10, further comprising a bell-detect circuit having an input coupled to the transmission line and an output coupled to the oscillator circuit, the bell-detect circuit configured to send a bell-detect signal to the oscillator circuit in the presence of a bell signal on the transmission line.

12. The circuit of claim 11, wherein the oscillator circuit is configured to generate the output signal at a third level in response to the bell-detect signal.

13. The circuit of claim 10, wherein the oscillator is configured to generate a null signal when the transmission line is busy, to generate an oscillating signal of a low level when the transmission line is idle, and to generate an oscillating signal of a high level when the transmission line is carrying a bell signal.

14. A method of interfacing a transmission line with user equipment, the method comprising:

galvanically isolating the transmission line from the user equipment;

detecting the condition of the transmission line;

generating an output signal of a first level across the galvanic isolation to the user equipment when the transmission line is not busy and of a second level that is a null signal when the transmission line is busy; and detecting the output signal on the user equipment side of the galvanic isolation and measuring the amplitude of the output signal on the user equipment independently from a transmission to detect whether the transmission line is busy or not busy.

15. The method of claim 14, wherein detecting the output signal comprises generating a detect signal in response to detecting the output signal on the other side of the galvanic isolation to control the user equipment such that the user equipment accesses the transmission line when the transmission line is not busy.

16. The method of claim 14, wherein detecting the condition of the transmission line comprises detecting the presence of a bell signal on the transmission line.

17. The method of claim 16, wherein generating an output signal comprises generating an output signal of a third level in response to detection of the bell signal on the transmission line.

18. The method of claim 14, wherein generating an output signal comprises generating an oscillating signal of a low level when the transmission line is idle, and generating an oscillating signal of a high level when the transmission line is carrying a bell signal.

* * * * *